United States Patent (12)
Hong et al.

(10) Patent No.: US 10,228,914 B2
(45) Date of Patent: Mar. 12, 2019

(54) APPARATUS AND METHOD OF PROVIDING A CODING EDUCATION SERVICE USING A BLOCK

(71) Applicant: Motionblue INC., Seoul (KR)

(72) Inventors: Je Hoon Hong, Seoul (KR); Na Yeon Hong, Seoul (KR)

(73) Assignee: Motionblue INC., Seoul (KR)

( * ) Notice: Subject to any disclaimer, the term of this patent is extended or adjusted under 35 U.S.C. 154(b) by 0 days.

(21) Appl. No.: 15/362,090

(22) Filed: Nov. 28, 2016

(65) Prior Publication Data

US 2018/0095732 A1 Apr. 5, 2018

(30) Foreign Application Priority Data

Oct. 4, 2016 (KR) .......................... 10-2016-0127609

(51) Int. Cl.
*G06F 9/44* (2018.01)
*G06F 8/34* (2018.01)
*G06F 3/0488* (2013.01)
*G06F 8/30* (2018.01)
*G09B 19/00* (2006.01)

(52) U.S. Cl.
CPC .............. *G06F 8/34* (2013.01); *G06F 3/0488* (2013.01); *G06F 8/311* (2013.01); *G09B 19/0053* (2013.01)

(58) Field of Classification Search
CPC ........................................................ G06F 8/34
USPC ......................................................... 717/107
See application file for complete search history.

(56) References Cited

U.S. PATENT DOCUMENTS 6,175,954 B1 * 1/2001 Nelson ...................... G06F 8/34
717/105

FOREIGN PATENT DOCUMENTS

KR 10-2014-0056977 A 5/2014
KR 10-1502271 B1 3/2015

OTHER PUBLICATIONS

Dai-Young Kwon et al., "Algorithmic Bricks: A Tangible Robot Programming Tool for Elementary School Students", Nov. 2012, IEEE, vol. 55, No. 4, pp. 474-479.*
Paulo Blikstein et al., "Project Bloks: designing a development platform for tangible programming for children", Jun. 2016.*
http://blog.naver.com/smilequeen/220748999581, Jun. 29, 2016.
Korean Office Action dated Aug. 18, 2017 for Korean Patent Application No. 10-2016-0127609.

* cited by examiner

*Primary Examiner* — Wei Y Zhen
*Assistant Examiner* — Lanny N Ung
(74) *Attorney, Agent, or Firm* — Hauptman Ham, LLP

(57) ABSTRACT

An apparatus and a method of providing coding education service using blocks are disclosed. The apparatus comprises a plurality of block disposition members configured to have unique coordinate, a main controller configured to identify plural coding blocks disposed on the block disposition members, and a communication module configured to transmit identification information and location information of each of the coding blocks to the user terminal to determine whether or not the coding blocks are disposed according to coding mission information displayed on a screen of the user terminal.

17 Claims, 20 Drawing Sheets

Coding card

FIG. 16

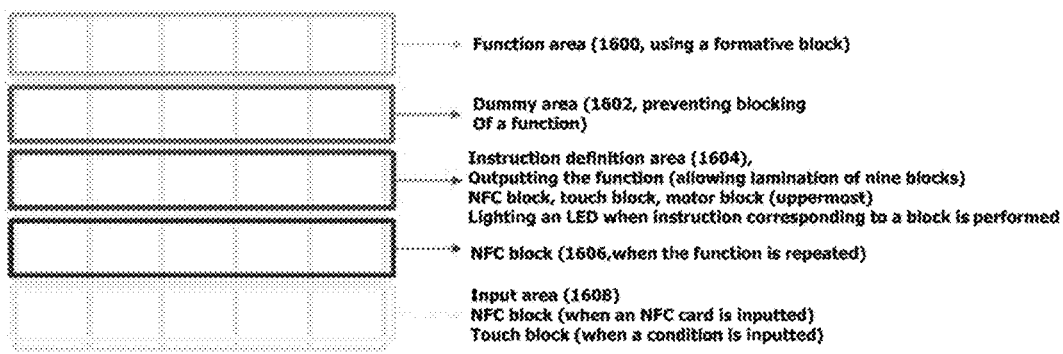

Coblo location

Function area (1600, using a formative block)

Dummy area (1602, preventing blocking of a function)

Instruction definition area (1604),
Outputting the function (allowing lamination of nine blocks)
NFC block, touch block, motor block (uppermost)
Lighting an LED when instruction corresponding to a block is performed NFC block (1606, when the function is repeated)

Input area (1608)
NFC block (when an NFC card is inputted)
Touch block (when a condition is inputted)

Coding direction of Coblo

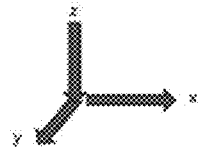

APPARATUS AND METHOD OF PROVIDING A CODING EDUCATION SERVICE USING A BLOCK

PRIORITY

This application claims priority under 35 U.S.C. § 119(a) to a Korean patent application filed on Oct. 4, 2016 in the Korean Intellectual Property Office and assigned Serial No. 10-2016-0127609, the entire disclosure of which is incorporated herein by reference.

TECHNICAL FIELD

The present disclosure relates to an apparatus and a method of providing a coding education service using a block.

BACKGROUND ART

An instruction set in a process of executing a computer program is called as a code. An action of inputting the code is referred to as a coding in the narrower sense.

However, the coding includes programming an algorithm about a step and a procedure for designing a program and solving a problem, and is also called as a computer programming.

In recent digital information era, a coding education is used for users specializing on the computer programming, and has also been used as a curriculum for training a solving ability of a problem since an elementary school.

The conventional coding education is based on software.

For example, coding mission information such as a route having a starting point and an end point and icons corresponding to individual instructions are displayed on a screen. The coding education is performed through a method of the user dragging the icon using a mouse according to the coding mission information.

It is not good in education if a coding education service is provided to young student through only the method using control of the mouse. This is because the young student is exposed to a computer for a long time.

The coding education service is not suitable for the young student who is not skilled to the control of the mouse or login to a website.

A method of providing easily a coding education service to young person using five senses has been required.

SUMMARY

Accordingly, the present invention is provided to substantially obviate one or more problems due to limitations and disadvantages of the related art.

One embodiment of the invention provides an apparatus and a method of providing a coding education service using five senses of a user by linking a physical space with an imaginary space.

In one aspect, the present invention provides an apparatus for providing a coding education service connected to a user terminal through a network, the apparatus comprising: a plurality of block disposition members configured to have unique coordinate; a main controller configured to identify plural coding blocks disposed on the block disposition members; and a communication module configured to transmit identification information and location information of each of the coding blocks to the user terminal to determine whether or not the coding blocks are disposed according to coding mission information displayed on a screen of the user terminal.

Each of the block disposition members belongs to at least one of a function definition area, a repetition number definition area, an instruction definition area or an input area.

The block disposition members are formed in (n×n) structure, and one or more of the function definition area, the repetition number definition area, the instruction definition area and the input area are set as an area corresponding to at least one axis in a vertical direction or a horizontal direction.

An execution order of each of the coding blocks is defined in a predetermined direction, in the instruction definition area.

A first function is defined by laminating sequentially the coding blocks in the function definition area and then disposing a first function block having a first shape on an uppermost part, and the first function is called in corresponding execution order when a function block having the same shape as the first shape is disposed on a certain position of the instruction definition area.

A repetition number of a first coding block disposed in the instruction definition area or a function is determined by a number block or a number tag disposed in the repetition number definition area adjacent to the first coding block or a function block, having a certain shape, for defining the function.

The user terminal determines whether or not the coding blocks are correctly disposed according to the coding mission information when a completion block is disposed in the instruction definition area.

The input area is an area where at least one of an NFC block on which an NFC tag for solving a quiz is laid or a touch block for determining one of conditions locates.

The function definition area is set as an area formed by a kth column and n rows, the repetition number definition area is set as an area formed by a (k+l)th column and the n rows, and the instruction definition area is set as an area formed by a (k+l+m)th column and the n rows, and wherein k, l and m are natural numbers more than 1.

In the instruction definition area, a block disposition member disposed on an uppermost part of the area formed by the (k+l+l)th column and the n rows is defined in a first execution order, and an execution order is defined in an order of coding blocks disposed adjacent to the block disposition member disposed on the uppermost part.

One of the function definition area, the instruction definition area, the repetition number definition area and the input area is set in an order of a kth row from a left upper part of the block plate, and the instruction definition area and the repetition number definition area are adjacent each other.

A plurality of coding blocks are vertically laminated on one block disposition member in the instruction definition area, and an execution order of the coding blocks laminated vertically is determined according to an order laminated from the block disposition member.

The function definition area is set as an area formed by a kth row and n columns, the instruction definition area is set as an area formed by a (k+l)th row and the n columns, and the repetition number definition area is set as an area formed by a (k+l+m)th row and the n columns, and wherein k, l and m are natural numbers more than 1.

The input area is set as an area formed by a (k+l+m+l)th row and the n columns.

The coding blocks include a first coding block laminated on the block disposition members and a second coding block laminated on the first coding block.

In another aspect, the present invention provides an apparatus for providing a coding education service connected to a block plate, on which a coding block is disposed, through a network, the apparatus comprising: a communication unit configured to receive identification information and location information of plural coding blocks disposed on the block plate from the block plate; a processor; and a memory connected to the processor. Here, the memory outputs coding mission block on a screen, and stores program instructions executable by the processor, to determine whether or not the coding blocks are correctly disposed according to the coding mission information by using the received identification information and the received location information.

In still another aspect, the present invention provides a method of providing a coding education service in a server connected to a user terminal through a network, the method comprising: receiving a coding mission information providing request from the user terminal; and transmitting a plurality of coding mission information and plural instructions corresponding to each of the coding mission information, function information and individual instruction, or repetition number information of a function to the user terminal. Here, the user terminal outputs one of the coding mission information on a screen, and receives identification information and location information of coding blocks disposed on a block plate from the block plate in which plural block disposition members having unique coordinate are disposed, to determine whether or not the coding blocks are correctly disposed according to the coding mission information outputted on the screen.

In one embodiment of the invention, a coding education service is provided by disposing a coding block on a block plate in physical space, thereby increasing interest of young students.

BRIEF DESCRIPTION OF DRAWINGS

Example embodiments of the present invention will become more apparent by describing in detail example embodiments of the present invention with reference to the accompanying drawings, in which:

FIG. 16 is a view illustrating a function, an repetition number and an instruction definition area according to another embodiment of the invention;

DETAILED DESCRIPTION

Example embodiments of the present invention are disclosed herein.

However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Hereinafter, various embodiments of the invention will be described in detail with reference to accompanying drawings.

Figure 1:
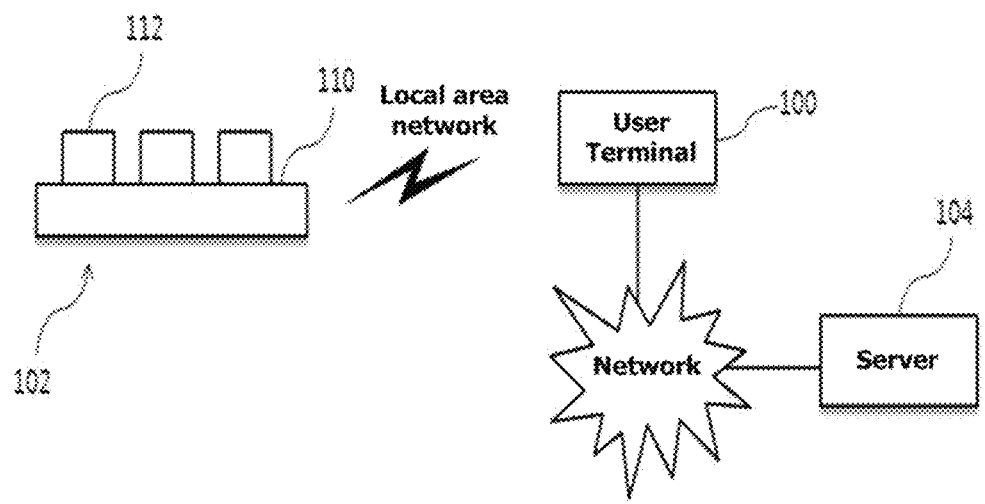
FIG. 1 is a view illustrating a system for providing a coding education service according to one embodiment of the invention.

FIG. 1 is a view illustrating a system for providing a coding education service according to one embodiment of the invention.

In FIG. 1, the system for providing the coding education service according to the invention includes a user terminal 100 and a block assembly 102.

The user terminal 100 is connected to the block assembly 102 through a network, and receives information transmitted from the block assembly 102.

The user terminal 100 may be a mobile communication terminal including a touch screen or a tablet. However, the user terminal 100 is not limited, but includes every terminal which communicates with the block assembly 102 and outputs certain information on a screen.

Preferably, the user terminal 100 and the block assembly 102 may be connected through a short range network such as a Bluetooth or a Wi-Fi. However, connection between the user terminal 100 and the block assembly is not limited.

The block assembly 102 of the present embodiment may include a block plate 110 and a block 112.

Figure 2:
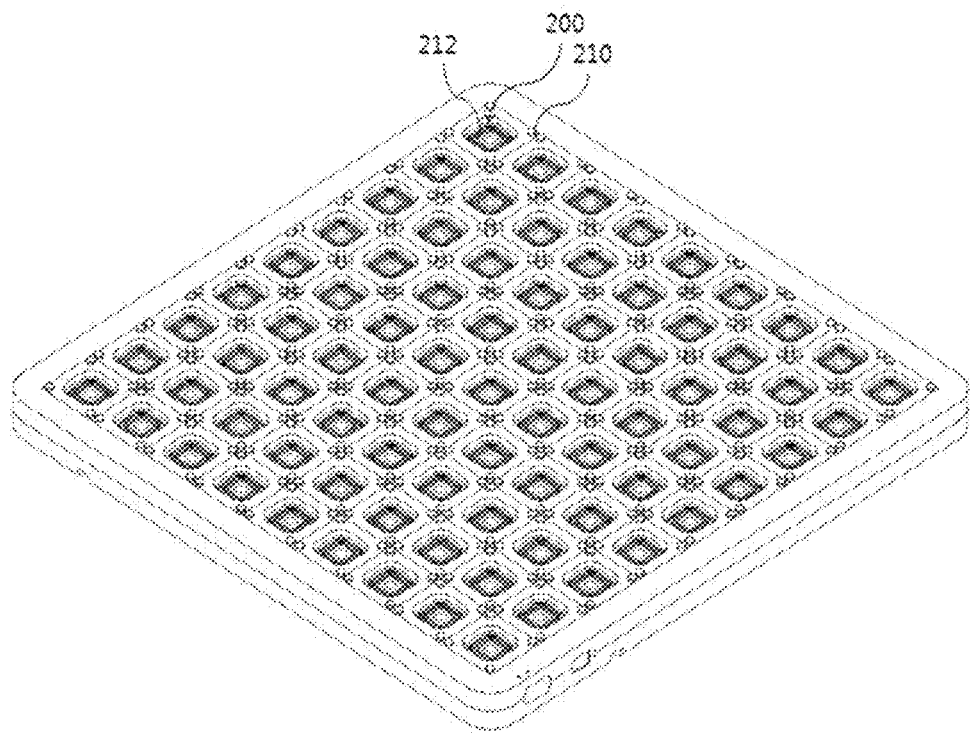
FIG. 2 is a perspective view illustrating a block plate according to one embodiment of the invention.
Figure 3:
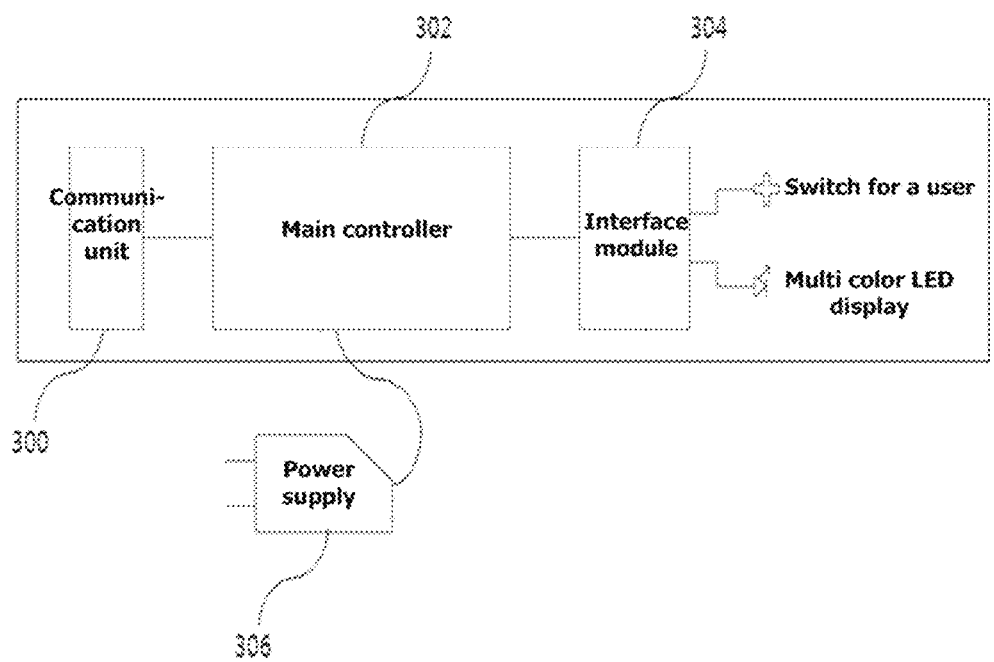
FIG. 3 is a view illustrating internal constitution of the block plate according to one embodiment of the invention.
Figure 4:
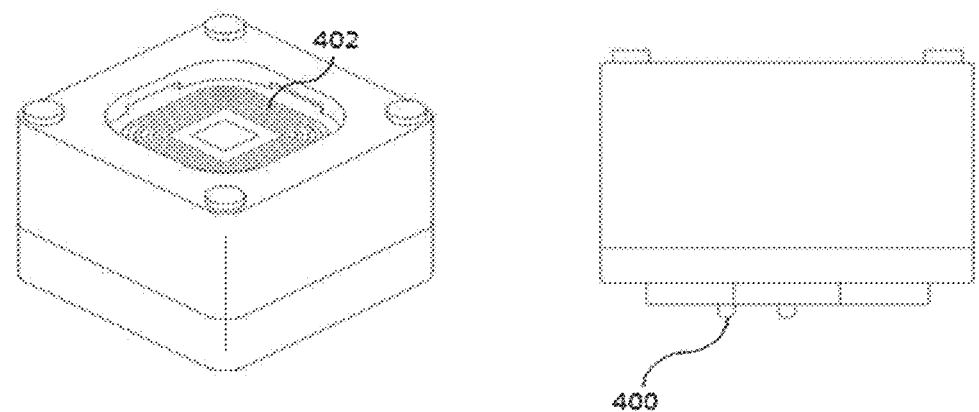
FIG. 4 is a perspective view illustrating a block according to one embodiment of the invention.
Figure 5:
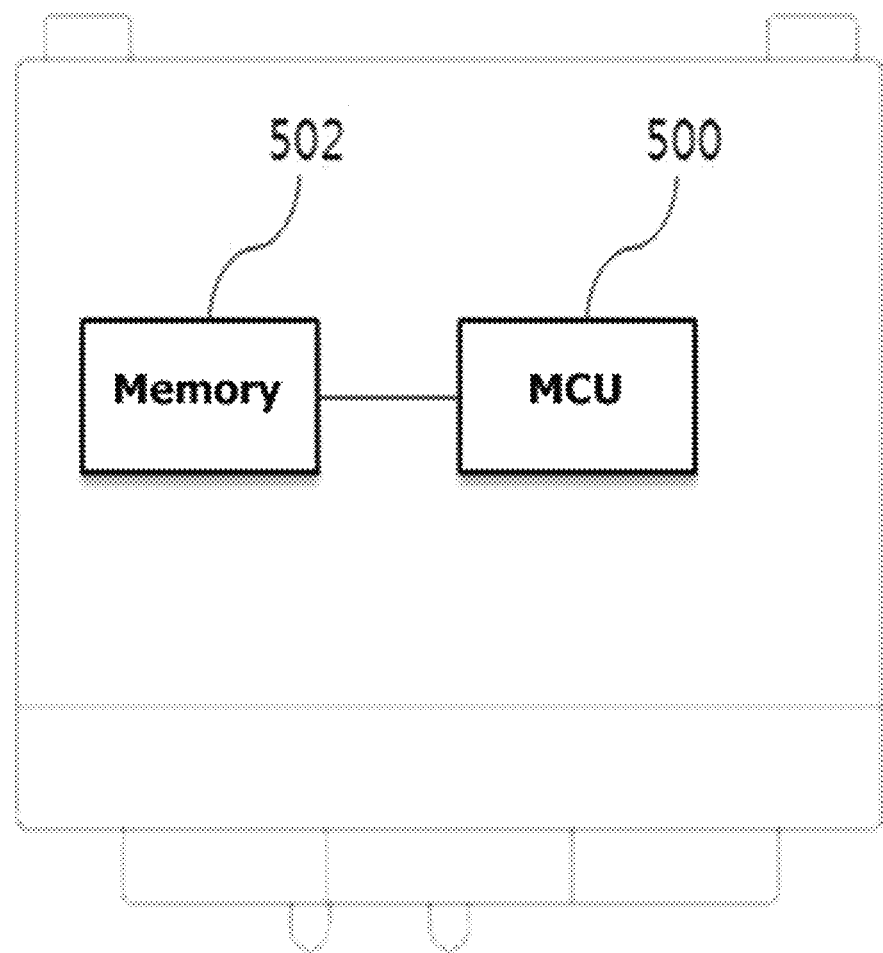
FIG. 5 is a view illustrating internal constitution according to one embodiment of the invention.

FIG. 2 is a perspective view illustrating a block plate according to one embodiment of the invention, and FIG. 3 is a view illustrating internal constitution of the block plate according to one embodiment of the invention. FIG. 4 is a perspective view illustrating a block according to one embodiment of the invention, and FIG. 5 is a view illustrating internal constitution of a block according to one embodiment of the invention.

In FIG. 2, the block plate 110 of the present embodiment includes a plurality of block disposition members 200.

FIG. 2 shows the block plate 110 including (9×9) block disposition members 200.

However, the block plate 110 may include (7×7) block disposition members 200 or (5×5) block disposition members 200.

Each of the block disposition members 200 has unique coordinate value, and is accessible the block 112.

Particularly, the block disposition member 200 may include a projection member 210 combined with the block 112 and an access unit 212 which supplies a power to the block 112 and transmits or receives data to/from the block 112.

It is desirable that the access unit 212 may be formed with pattern in a certain area of individual block disposition members 200. Here, the pattern of the access unit 212 is electrically connected to corresponding terminal 400 formed on a lower part of the block 112.

The terminal 400 of the block 112 may be formed with a spring pin (pogo pin). A magnet is formed to at least one of the block disposition member 200 or the block 112, and thus the block disposition member 200 and the block 112 may be stably combined.

As shown in FIG. 4, a block disposition member 402 may be formed with the same pattern as the block disposition member 200 of the block plate 110 on the block 112.

Another block 112 may be laid on the block disposition member 402 of the block 112.

As shown in FIG. 3, the block plate 110 of the present embodiment may include a communication module 300, a main controller 302, an interface module 304 and a power module 306.

The communication module 300 performs a short range wireless communication (e.g. Bluetooth) with another device (for example, the user terminal 100).

For example, the communication module 300 may be pairing-connected to the user terminal 100 via the short range wireless communication. Since the pairing-connection is well-known by a person in an art, any description concerning the pairing-connection will be omitted.

The communication module 300 transmits location information (i.e. coordinate value) and identification information of a disposed block 112 to the user terminal 100 pairing-connected thereto, according to a control of the main controller 302. The communication module 300 may transmit height information as well as the location information and the identification information of the block 112.

Here, the height information means lamination order information of the blocks 112 when plural blocks 112 are laminated on one block disposition member 200.

The main controller 302 supplies a power to the block 112 when the block 112 is disposed on the block plate 110, and obtains the identification information of corresponding block 112 from a memory 502 of the block 112.

As shown in FIG. 5, the block 112 of the present embodiment may include an MCU 500 for storing its identification information and the memory 502.

The MCU 500 receives the power when it is electrically connected to the block plate 110 and delivers its identification information to the block plate 110.

In the event that the block 112 is disposed on the block plate 110, the main controller 302 transmits the identification of the block 112 disposed on certain block disposition member 200 and location information (coordinate value) of the block disposition member 200 to the user terminal 100 through the communication module 300.

In one embodiment, a coding education service is provided through block disposition in the physical space.

As shown in FIG. 1, the user terminal 100 is connected to the server 104 trough the network, and receives coding mission information.

Here, the network may include a wired/wireless internet or a mobile communication network.

The coding mission information corresponds to a mission to be completed by the user through sequential execution of instructions.

The server 104 transmits a plurality of coding mission information and instructions corresponding to the coding mission information, function information and repetition number information of individual instruction or function, when it receives a coding mission information providing request from the user terminal 100. The server 104 transmits also quiz information, etc. needed from a coding process to the user terminal 100.

The user terminal 100 receives the coding mission information from the server 104 and displays the received coding mission information on a screen.

The server 104 may be a general appstore server. The user terminal 100 may download in advance an application needed for coding education and install the downloaded application.

The downloaded application may include coding mission information according to a level of difficulty and relative information.

Hereinafter, a process of providing the coding education service of the invention will be described with reference to drawings.

The block plate 110 and the block 112 of the present embodiment are used for providing the coding education service. The block 112 of the present embodiment includes a moving block, a jump block, a pushing block, a crawling block, a rotating block, an extension block, an enlarging block, a reduction block, a flip block, a transparent block and an operation instruction block.

The block 112 may also include a button block, a motor block, a touch block, a switch block, a gear block, a voice recognition block, a function block such as an LED block and a completion block and a color block.

Here, the completion block indicates a block disposed near final coding block after disposing coding blocks according to coding mission.

The user terminal 100 determines whether or not the coding is correctly performed when it receives completion block disposition information from the block plate 110.

Figure 6:
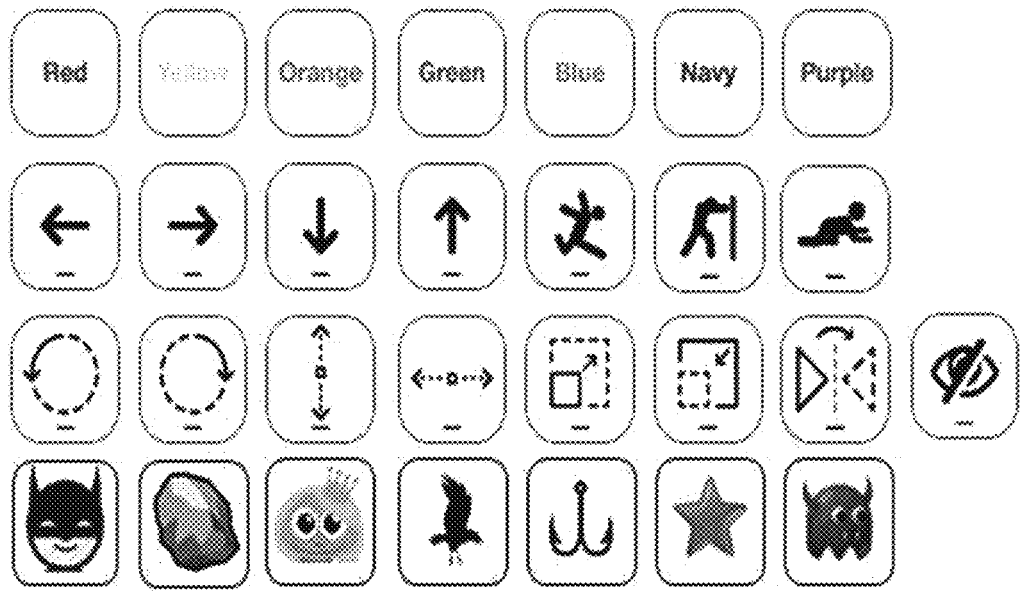
FIG. 6 is a view illustrating a coding card according to one embodiment of the invention.

Attribute corresponding to respective operations or colors may be preset to the operation instruction block and the color block. In another embodiment, as shown in FIG. 6, the operation instruction block or the color block may be set by accessing electrically a coding card to a block 112 desired by the user or a tag method.

In this time, the MCU 500 of the block 112 recognizes the coding card when the coding card is combined with the block 112, and delivers the recognized coding card to the block plate 110.

Hereinafter, it is assumed that the attribute of the block 112 is determined by the cording card or by itself for convenience of description, and the block 112 will be defined as the coding block.

Figure 7:
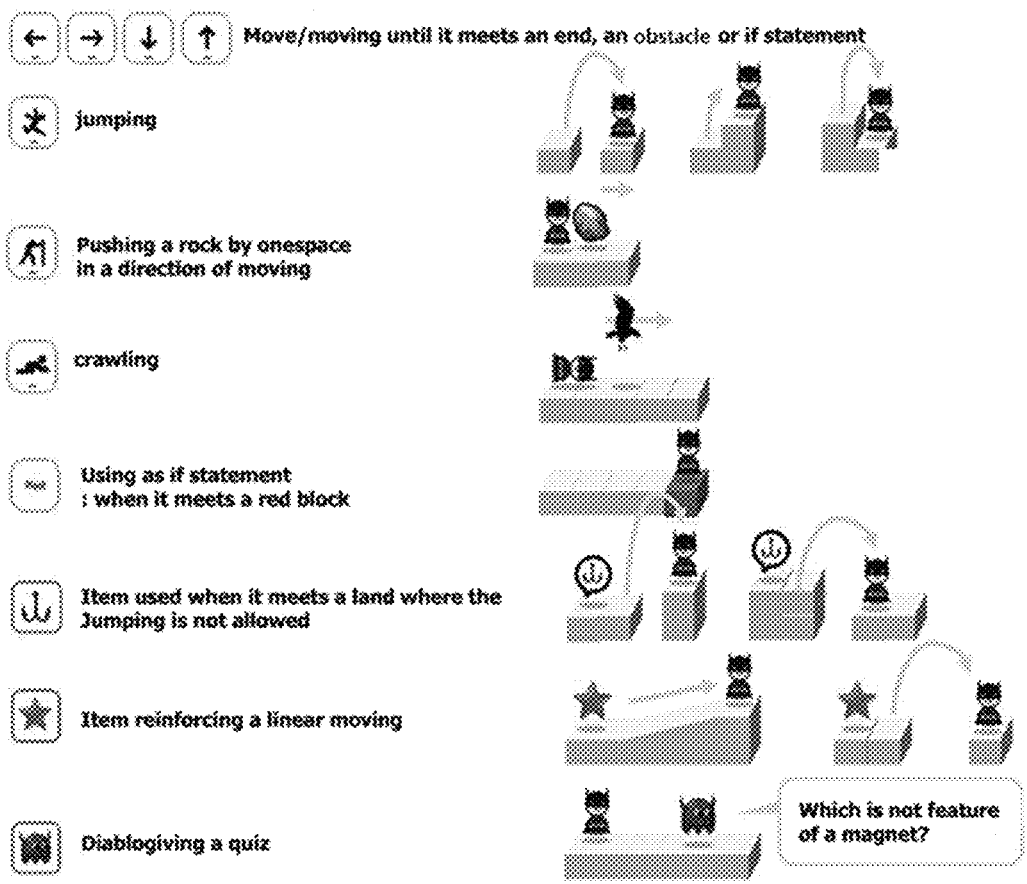
FIG. 7 is a view illustrating attribute of the coding block according to one embodiment of the invention.

FIG. 7 is a view illustrating attribute of the coding block and a graphic object (item on a screen) according to one embodiment of the invention.

As shown in FIG. 7, the moving coding block is a block for moving a character shown on an imaginary screen in a certain direction. The character moves in the certain direction until it meets an end, an obstacle or an IF statement.

A jump coding block is a block for jumping the obstacle.

The crawling block is a block for crawling under the obstacle.

A red coding block is a block used as IF statement.

A tightrope walking coding block is a block for leaping lands having different height.

A reinforcement coding block is a block for reinforcing a moving of the character on a sloping land.

A quiz item is an item giving a quiz.

In one embodiment, the coding education service is provided by disposing the coding blocks on the block plate.

In one embodiment, a first axis for defining a function, a second axis for defining repetition number and a third axis for defining an instruction are set to the block plate 110, so that correct coding about the coding mission information can be achieved, or repetition sentence structure or an education about function call can be performed.

Figure 8:
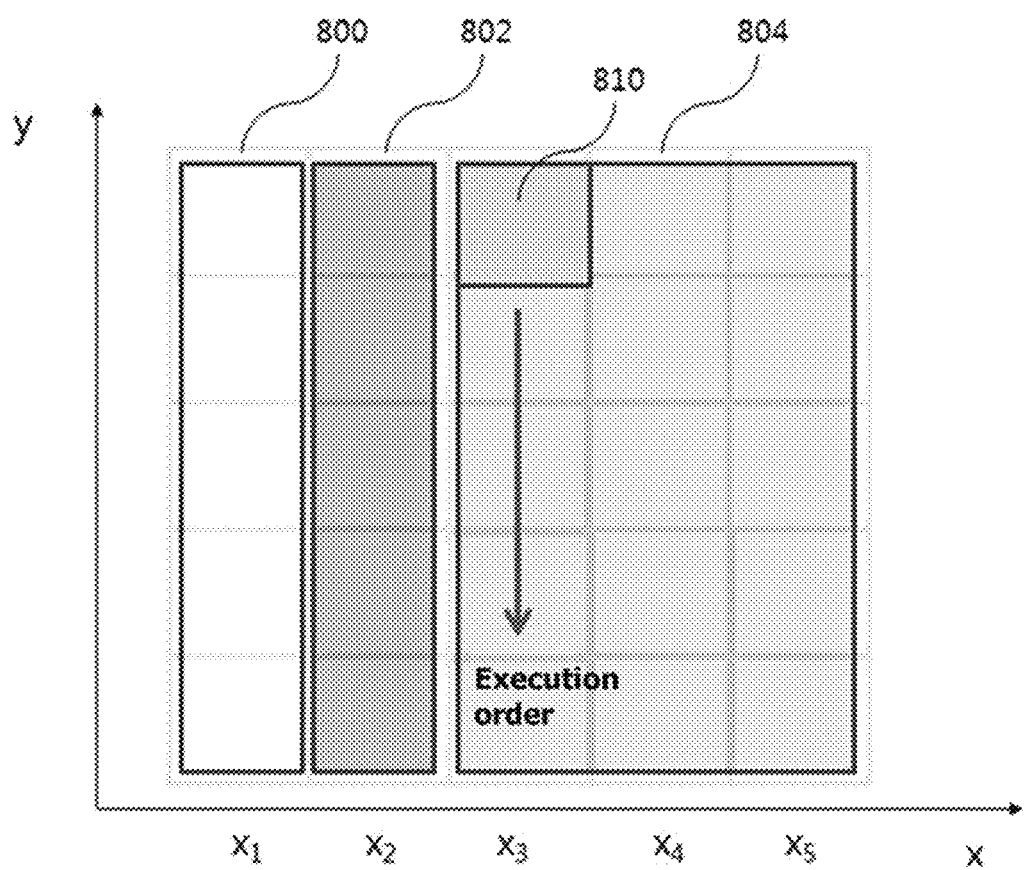
FIG. 8 is a view illustrating individual axis defining the function, the repetition number and the instruction to the block plate according to the one embodiment of the invention.

FIG. 8 is a view illustrating individual axis defining the function, the repetition number and the instruction to the block plate according to the one embodiment of the invention.

FIG. 8 shows (5×5) block plate 110 according to one embodiment of the invention. A first axis to a fifth axis (y axis corresponding to $x_1$ to $x_5$) exist in a vertical direction. A first axis $x_1$ in leftmost vertical direction is set as a function definition area 800 where a coding block for defining a function is disposed. A second axis $x_2$ adjacent to the first axis $x_1$ is set as a repetition number definition area 802 where a coding block for defining repetition number is disposed.

At least one axis (a third axis $x_3$ to a fifth axis $x_5$) adjacent to the repetition number definition area 802 is set as an instruction definition area 804 where a coding block for defining an instruction is disposed.

In one embodiment, in the event that (n×n) block disposition members exist, the function definition area 800 is set as an area formed by a kth column and n rows, the repetition number definition area 802 is set as an area formed by (k+l)th column and the n rows, and the instruction definition area 804 is set as an area formed by (k+l+m)th column and the n rows. Here, k, l and m are natural numbers more than 1.

It is desirable that the function definition area 800 may be an area formed by the first column and the n rows, the repetition number definition area 802 may be an area formed by a second column and the n rows, and the instruction definition area may be an area formed by the other column and the n rows.

An input area (not shown) where an NFC block on which an NFC tag for solving a quiz on the coding mission information is laid and a touch block for determining one of conditions when a certain condition is provided, etc. locates may be set in the block plate 110.

The input area may be preferably set as an area formed by final column and the n rows.

In above description, the function definition area, the repetition number definition area and the instruction definition area are sequentially set in a direction from left to right of the block plate. However, this disposition is not limited. For example, the areas may be formed in reverse structure of the above setting of the columns and the rows. This will be described below.

In one embodiment, an execution order of the coding blocks is set in the instruction definition area 804.

For example, an instruction coding block corresponding to a first execution order is disposed on an uppermost part 810 of an area (third axis) adjacent to the repetition number definition area 802 of the instruction definition area 804.

It is desirable that the execution order may be set in a downward direction of the uppermost part 810.

In one embodiment, the execution order may be preset to only the area which is formed by (k+l+l)th column and the n rows and is adjacent to the repetition number definition area 802. In the other axes, an execution order may be defined in an order from a coding block located at lowermost part of the third axis to adjoining coding block.

Additionally, only the uppermost part of the instruction definition area 804 may be defined in the first execution order, and the execution order may be defined in an order from the uppermost part to adjoining coding block.

The execution order will be described in detail with reference to accompanying other drawing.

The repetition number may be set by disposing a number block at a position adjacent to each of the instruction coding blocks of the second axis 802.

In one embodiment, the repetition number may be determined by laying a number tag on a block which can identify an NFT tag.

In one embodiment, an area formed by pth column and the n rows may be set as a dummy area.

Preferably, the dummy area may locate between the function definition area 800 and repetition number definition area 802. This is for preventing confusion of the function block from the repetition number.

In FIG. 8, the first axis 800 and the second axis 802 correspond to a single axis respectively. However, the first axis 800 and the second axis 802 may correspond to a plurality of axes, respectively.

Figure 9:
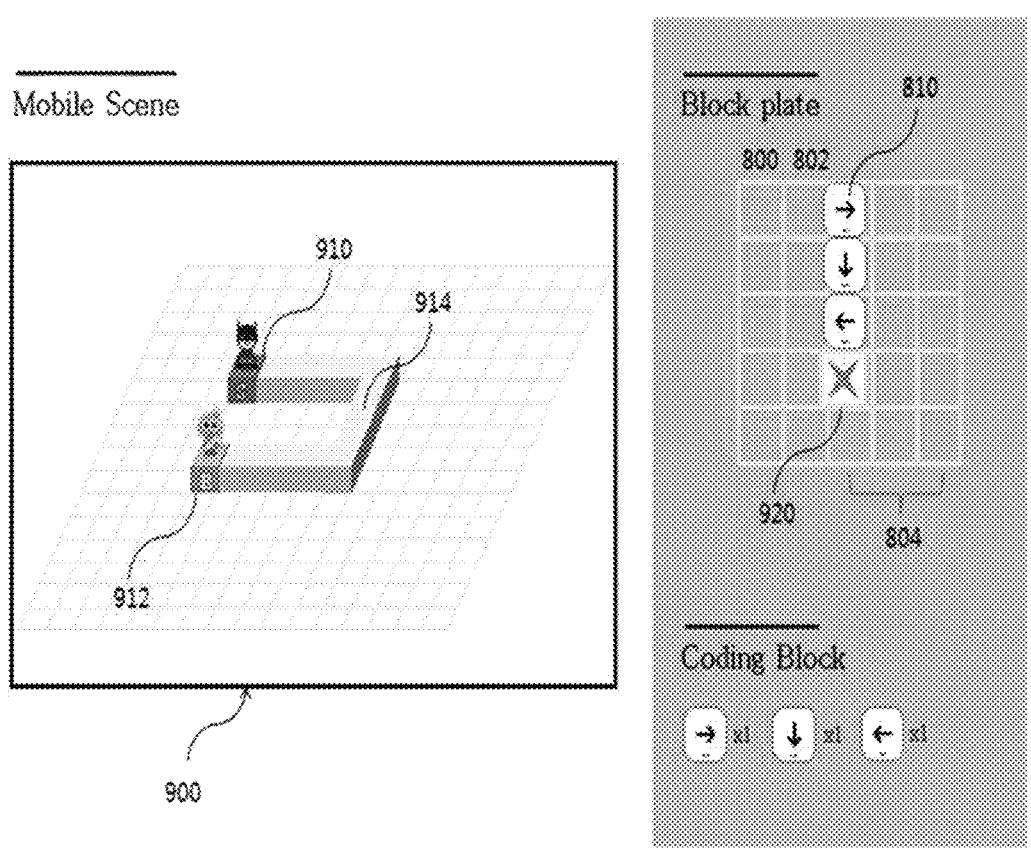
FIG. 9 is a view illustrating a coding process according to one embodiment of the invention.

FIG. 9 is a view illustrating a coding process according to one embodiment of the invention.

As shown in FIG. 9, coding mission information is displayed on a screen 900 of the user terminal 100.

The coding mission information in FIG. 9 includes a starting point 910, an end point 912 and a route 914.

A character should move in a right direction, a downward direction and a left direction, so as to complete a coding mission, i.e. move the character from the starting point 910 to the end point 912.

According to the coding mission information, the user sequentially arranges a right moving coding block, a downward moving coding block and a left moving coding block in a downward direction from the uppermost part 810.

In one embodiment, a completion block 902 may be disposed adjacent to final coding block (left moving coding block), to recognize disposition completion of the coding block.

The user terminal 100 determines whether or not the coding is accurately performed when it receives disposition information of the completion block 920 from the block plate 110.

It is desirable that the completion block 920 is disposed on an area for defining the instruction. For example, the completion block 920 is disposed adjacent to the final coding block.

Figure 10:
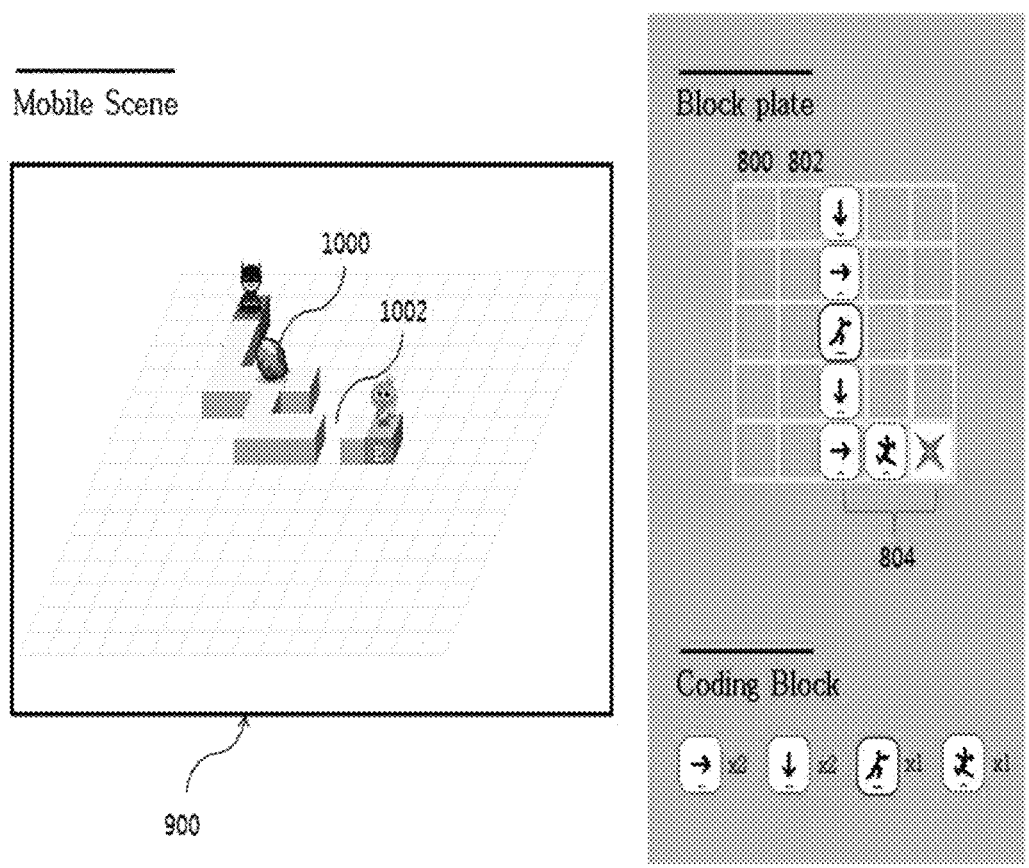
FIG. 10 is a view illustrating a coding process according to one embodiment of the invention.

FIG. 10 is a view illustrating a coding process according to one embodiment of the invention.

FIG. 10 illustrates coding mission information where an obstacle 1000 and a place 1002 at which the route is cut exist in a route.

The user disposes suitably a pushing coding block and a jump coding block with a coding block for moving in the instruction definition area 804 of the block plate 110.

In the event that the completion block is disposed after the disposition of the coding blocks is completed, the user terminal 110 determines whether or not plural coding blocks are correctly disposed according to the coding mission information.

Figure 11:
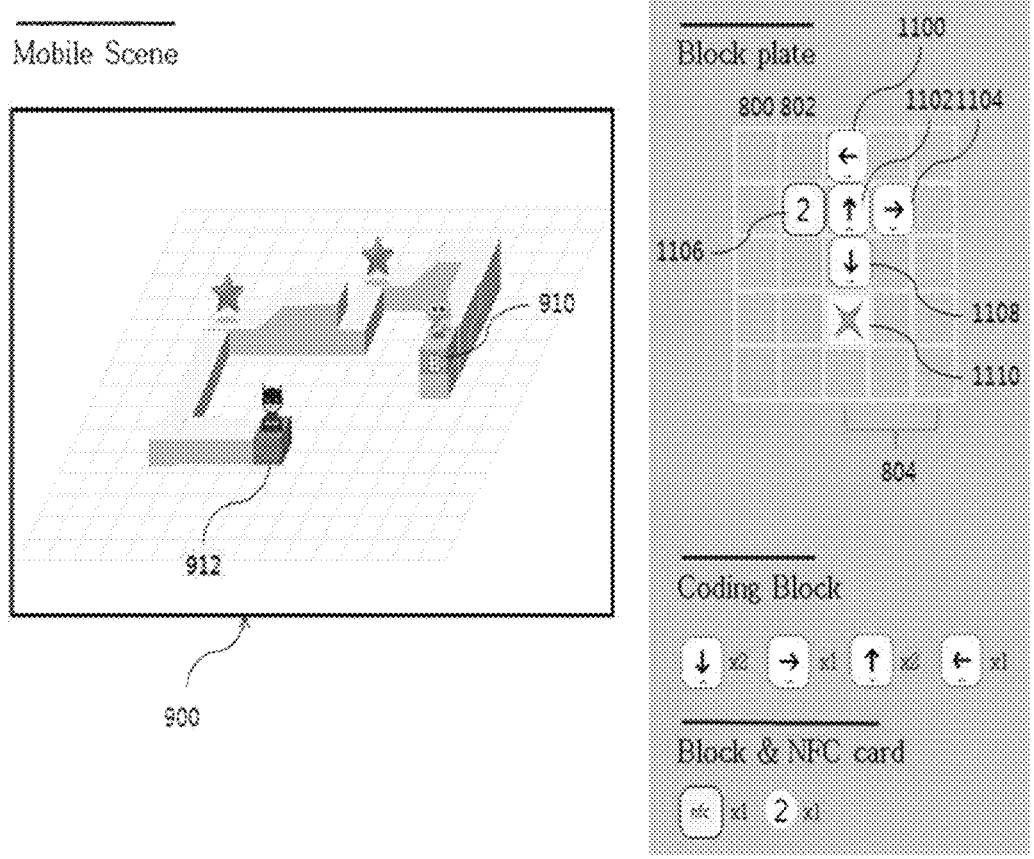
FIG. 11 is a view illustrating a disposition of a coding block for defining repetition number according to one embodiment of the invention.

FIG. 11 is a view illustrating a disposition of a coding block for defining repetition number according to one embodiment of the invention.

In FIG. 11, a left moving, an upward moving, a right moving, an upward moving, a right moving and a downward moving should be sequentially performed so that a character can move from a starting point 910 to an end point 912.

An operation, that the right moving is executed after the upper moving is performed, is repeated twice according to coding mission information in FIG. 11.

To dispose efficiently the coding block, a left moving coding block 1100 is disposed on the uppermost part 810 of the instruction definition area 804 of the block plate 110.

Afterward, an upward moving coding block 1102 and adjoining right moving coding block 1104 are disposed, and a tag or a coding block 1106 indicating number 2 is disposed in the repetition number definition area 802.

The number and two moving coding blocks mean repeating twice the operation that the right moving is executed after the upward moving is performed.

The coding is completed when a downward coding block 1108 and a completion block 1110 are sequentially disposed under the upward moving coding block 1102 in the third axis.

In FIG. 11, operations corresponding to plural coding blocks are repeatedly performed in sequence by n times when the coding blocks are disposed adjacent to a number n, which is disposed in the repetition number definition area 802, in a direction of an x axis.

Figure 12:
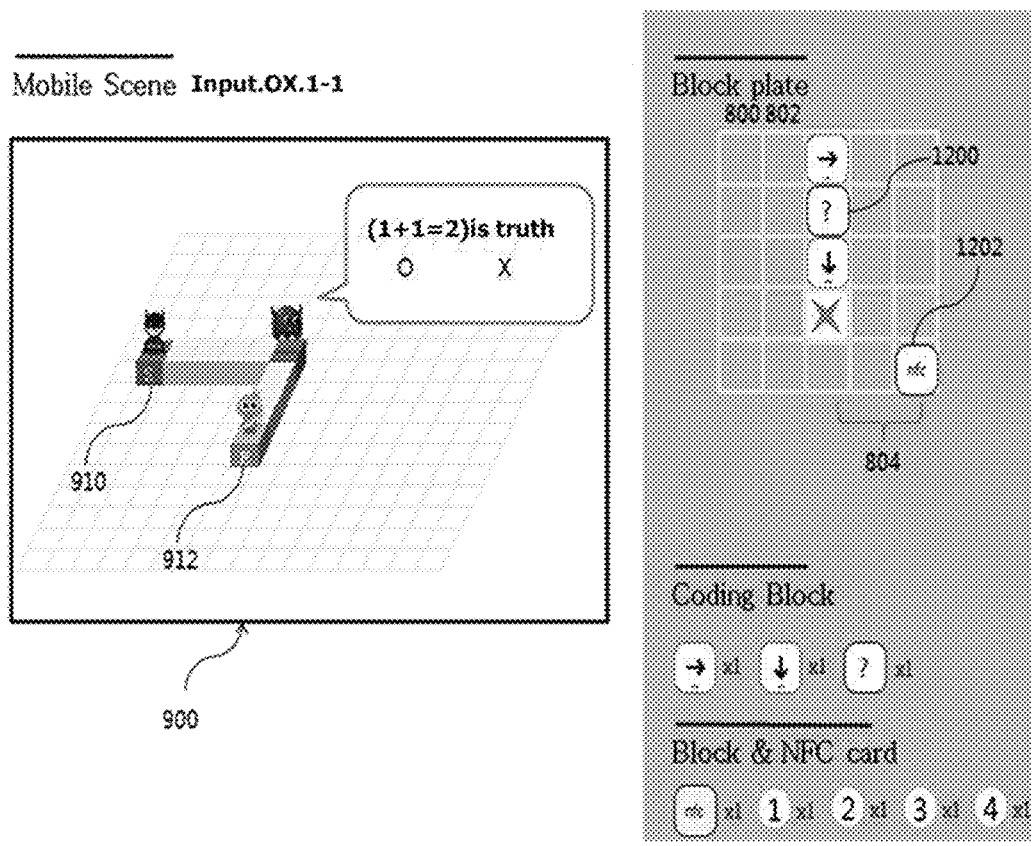
FIG. 12 is a view illustrating a coding process when a quiz is provided according to one embodiment of the invention.

FIG. 12 is a view illustrating a coding process when a quiz is provided according to one embodiment of the invention.

FIG. 12 shows an example of moving a character in a right direction from the starting point 910, answering a quiz and moving the character in a downward direction when the answer is correct answer to reach the end point 912.

As illustrated in FIG. 12, a quiz block 1200 is disposed in the instruction definition area 804, to show arrival to a quiz item after the character moves in the left direction.

To answer correctly the quiz displayed on the screen, a block (NFC block) 1202 for identifying an NFC tag is disposed on a certain area of the instruction definition area 804.

The user puts a proper tag on the NFC block 1202 in response to the quiz displayed on the screen. The character moves in next route when the tag corresponds to the correct answer.

Figure 13:
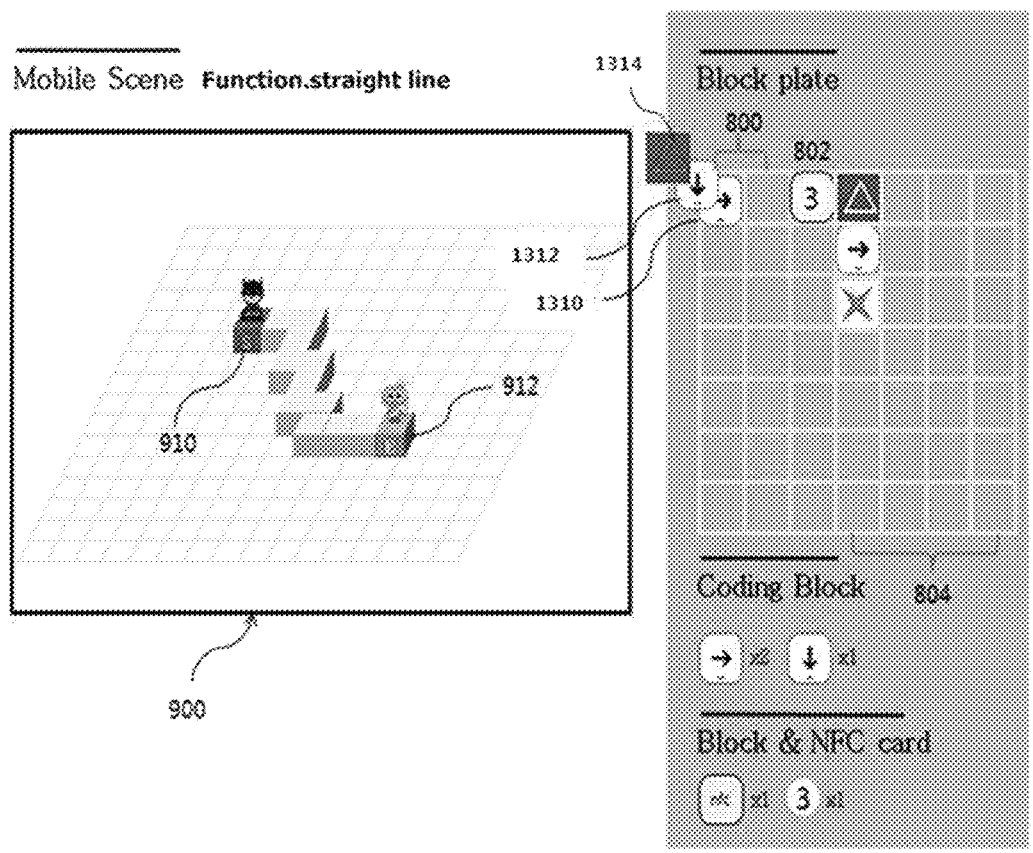
FIG. 13 to FIG. 15 are views coding processes using a function according to one embodiment of the invention.
Figure 14:
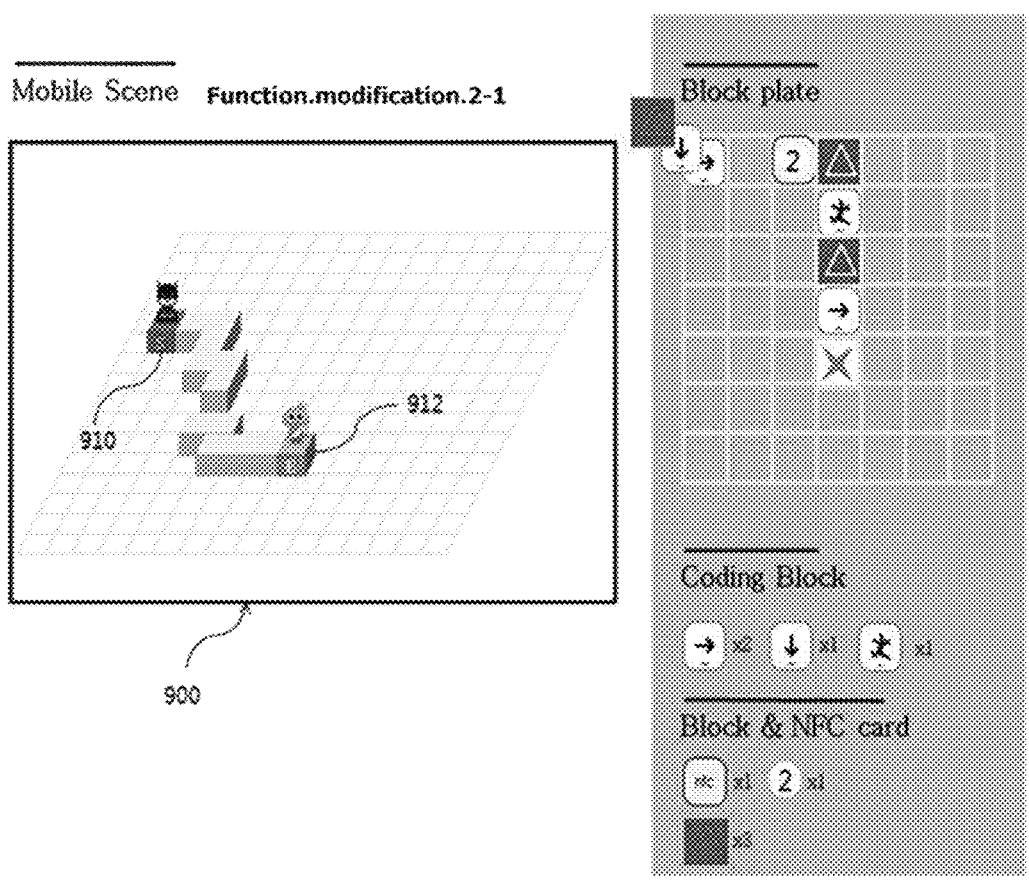
Figure 15:
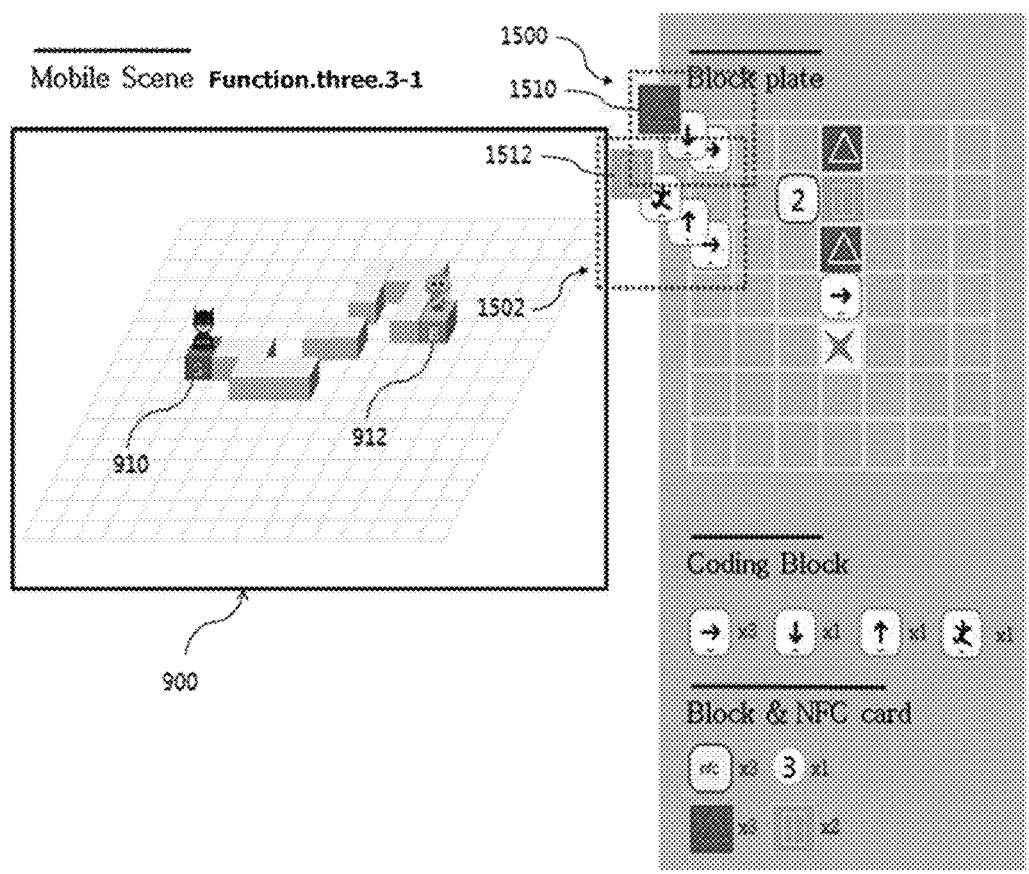

FIG. 13 to FIG. 15 are views coding processes using a function according to one embodiment of the invention.

FIG. 13 to FIG. 15 illustrate (7×7) block plate. It is assumed that the function definition area 800 corresponds to leftmost axis and adjoining second axis in a vertical direction, the repetition number definition area 802 corresponds to a third axis, and the instruction definition area 804 corresponds to the other axes.

In FIG. 13, a user may define a function by disposing coding blocks in the function definition area 800.

In a routine in FIG. 13, a right moving and a downward moving should be repeatedly performed, and a right moving is performed just before an end point 912.

A right coding block 1310 and a downward coding block 1312 are sequentially laminated in the function definition area 800, in consideration of repetitive performance of the right moving and the downward moving. Then, a function block 1314 is laminated on the downward coding block 1312, and so the function including two coding blocks 1310 and 1312 is defined.

If the function is defined as mentioned above, the coding process using the blocks may be simplified in the event that a block having the same shape as the function block 1314 is disposed in the instruction definition area 804 and an repetition number is defined in the repetition number definition area 802.

In one embodiment, a plurality of blocks of which top parts have triangular shape, tetragonal shape, pentagonal shape, a circular shape, etc. may be provided, and they may be used as the function block.

As described above, an operation corresponding to function call is performed in the event that the coding blocks for directional moving are disposed in the function definition area, the function block for defining the function with certain shape is disposed on the uppermost part, and then the function block having the same shape as corresponding function block is disposed in the instruction definition area.

FIG. 14 is a view illustrating an example for using one function by several times in the instruction definition area.

As shown in FIG. 14, a function defined in the function definition area 800 may be called by several times.

FIG. 15 is a view illustrating an example for defining plural functions in the function definition area and calling the functions in the instruction definition area.

Referring to FIG. 15, plural coding blocks for a first function 1500 and a second function 1502 are disposed in the function definition area 800, and a first function block 1510 and a second function block 1512 having different shape are laminated.

The user may complete a coding by disposing properly the function blocks 1510 and 1512 in the instruction definition area 804.

In the above description, the coding blocks are disposed at a position adjacent to the uppermost part of the instruction definition area 804 and at positions adjacent to sequential next parts of the uppermost part, in the block plate 110.

In another embodiment, the coding may be performed by laminating vertically the coding blocks without disposing adjacently.

FIG. 16 is a view illustrating a function, an repetition number and an instruction definition area according to another embodiment of the invention.

In (n×n) block plate in FIG. 16, a function definition area 1600 is defined as an area formed by a kth row from an uppermost part of the block plate and n columns and a dummy area 1602 is defined as an area formed by (k+1)th row and the n columns. An instruction definition area 1604 is defined as an area formed by (k+l+1)th row and the n columns, an repetition number definition area 1606 is defined as an area formed by a (k+l+m)th row and the n columns, and an input area 1608 is defined as an area formed by (k+l+m+1)th row and the n columns.

The function definition area 1600 related directly to a coding block is defined as the area formed by the kth row and the n columns, the instruction definition area 1604 is defined as the area formed by the (k+l)th row and the n columns, and the repetition number definition area 1606 is defined as the area formed by (k+l+m)th row and the n columns. Here, the instruction definition area 1604 and the repetition number definition area 1606 are adjacently disposed.

The input area 1608 means an area in which an NFC block on which an NFC tag for solving a quiz is laid, a touch block for determining one of plural conditions according to a certain condition, etc. locate.

In an example of (5×5) block plate, the function definition area 1600 is defined as the area formed by a first row from the uppermost part and 5 columns, and the dummy area 1602, the instruction definition area 1604, the repetition number definition area 1606 and the input area 1608 are respectively defined as areas formed by 5 columns and sequential rows downward from the uppermost part.

If the areas are defined as shown in FIG. 16, an instruction coding block executed as first action in the instruction definition area 1604 may be leftmost disposed in the instruction definition area 1604.

The coding block is vertically laminated in FIG. 16, and thus the repetition number may be defined by disposing the NFC block on the coding blocks laminated at one coordinate and laying the number tag on the NFC block.

However, for the function block, since a formative block on which none other block can be laid is used for defining the function, an repetition number of the function may be defined by disposing a block for defining the repetition number and corresponding tag in the repetition number definition area 1606.

FIG. 17 to FIG. 22 are views illustrating disposition of coding mission information and a coding block according to another embodiment of the invention.

Figure 17:
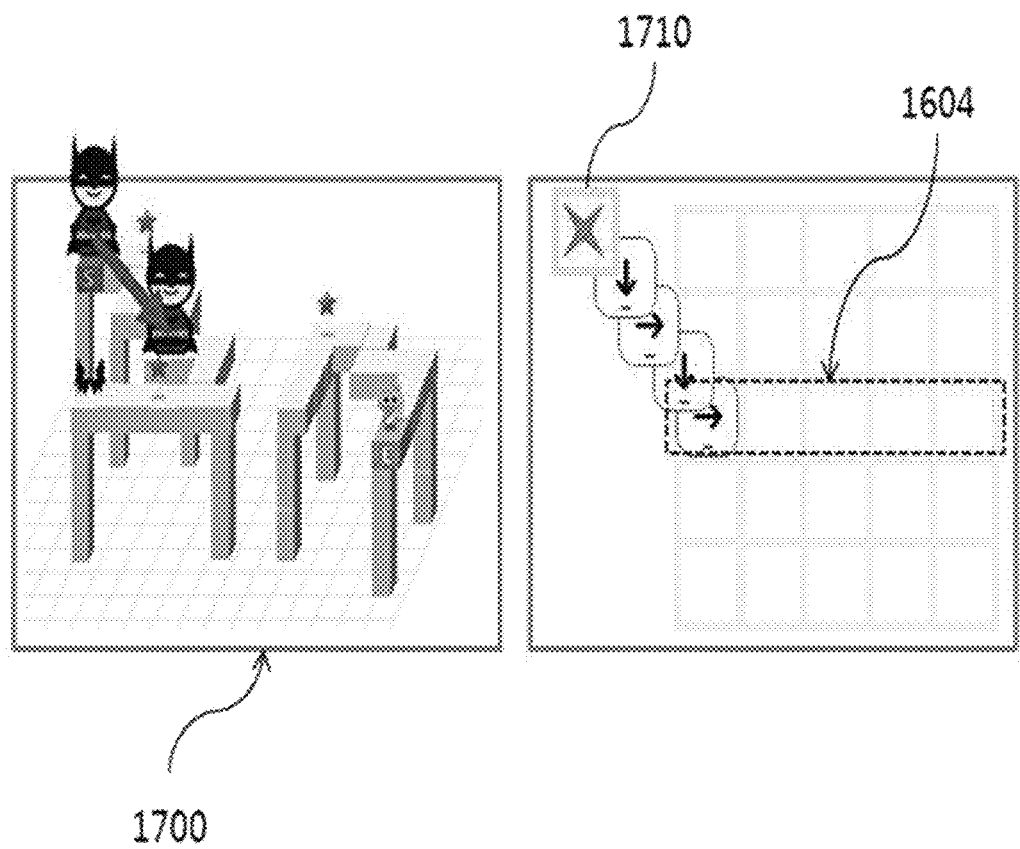
FIG. 17 to FIG. 22 are views illustrating disposition of coding mission information and a coding block according to another embodiment of the invention.

FIG. 17 shows coding mission information 1700 displayed on the screen of the user terminal 100, and a process of disposing the block plate 110 and coding blocks in a physical space according to the coding mission information 1700.

In FIG. 17, a right moving coding block, a downward moving coding block, a right moving coding block and a downward moving coding block are sequentially disposed at a leftmost part of the instruction definition area 1604, and a completion block 1710 is disposed.

In the event that the coding blocks are disposed as shown in FIG. 17, a character moves from a starting point to a position corresponding to disposition of the coding blocks in a routine of coding mission.

However, the character returns to an original position because a final position in accordance with the disposition of the coding blocks is not an end point.

Figure 18:
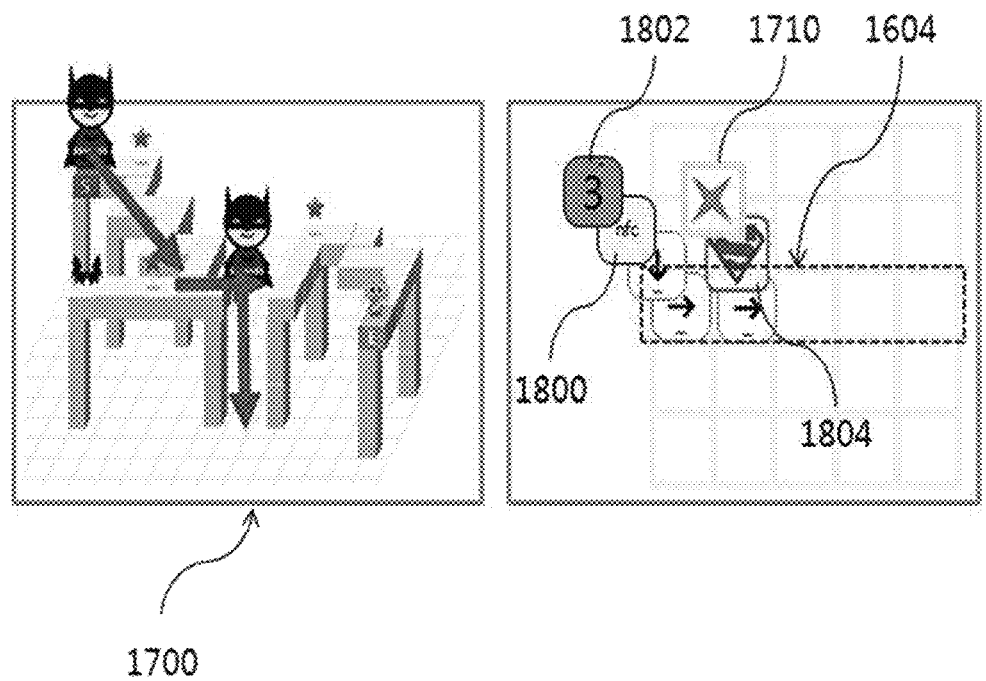

In FIG. 18, a right coding block and a downward coding block are sequentially disposed in the instruction definition area 1604, and an NFC block 1800 and a number tag 1802 corresponding to a number 3 are disposed on the downward coding block.

A right coding block corresponding to next execution order, a special action coding block 1804 and the completion block 1710 is adjacently disposed in a right direction of a block for defining the repetition number.

In the event that the coding blocks are disposed as shown in FIG. 18, the character falls when a left moving from a starting point and a downward moving are repeated by three times and then a right moving is performed. As a result, the coding mission is not completed, and thus the character returns to the original position.

A graphic object (wing) should be obtained by performing a left moving after a left moving and a downward moving are performed so that the character is not fallen.

Figure 19:
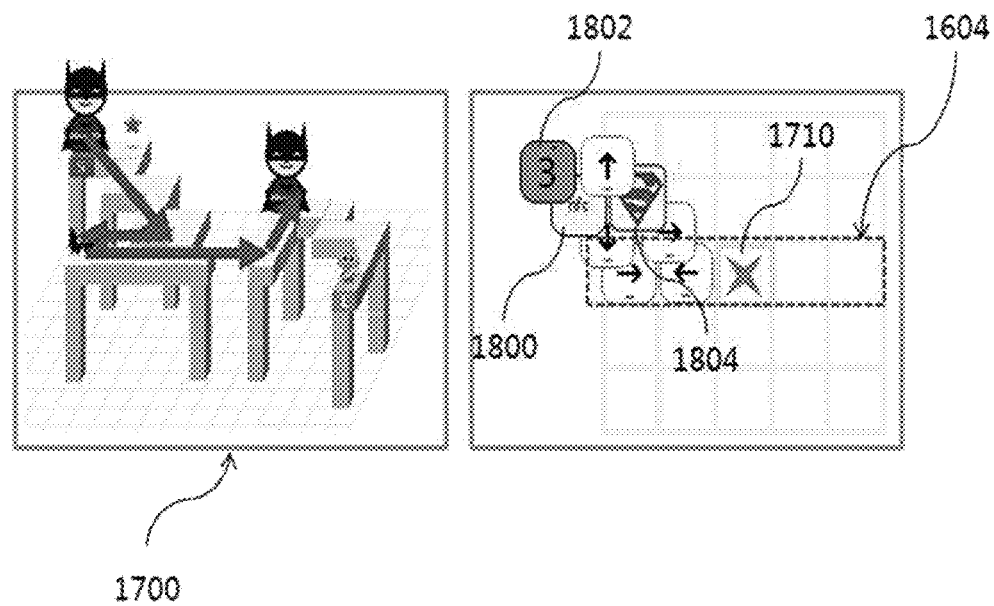

In FIG. 19, the coding blocks are disposed at a leftmost part of the instruction definition area 1604 as shown in FIG. 18. A left moving coding block, a right moving coding block, a special action coding block and an upward moving coding block are disposed in an area adjacent to the coding blocks.

Here, the special action coding block 1804 means a block for jumping the character.

In the event that the coding blocks are disposed as shown in FIG. 19, the character may move to another routine by jumping it. However, since the character cannot move up to the end point, it moves to a first position on the user terminal 100.

Figure 20:
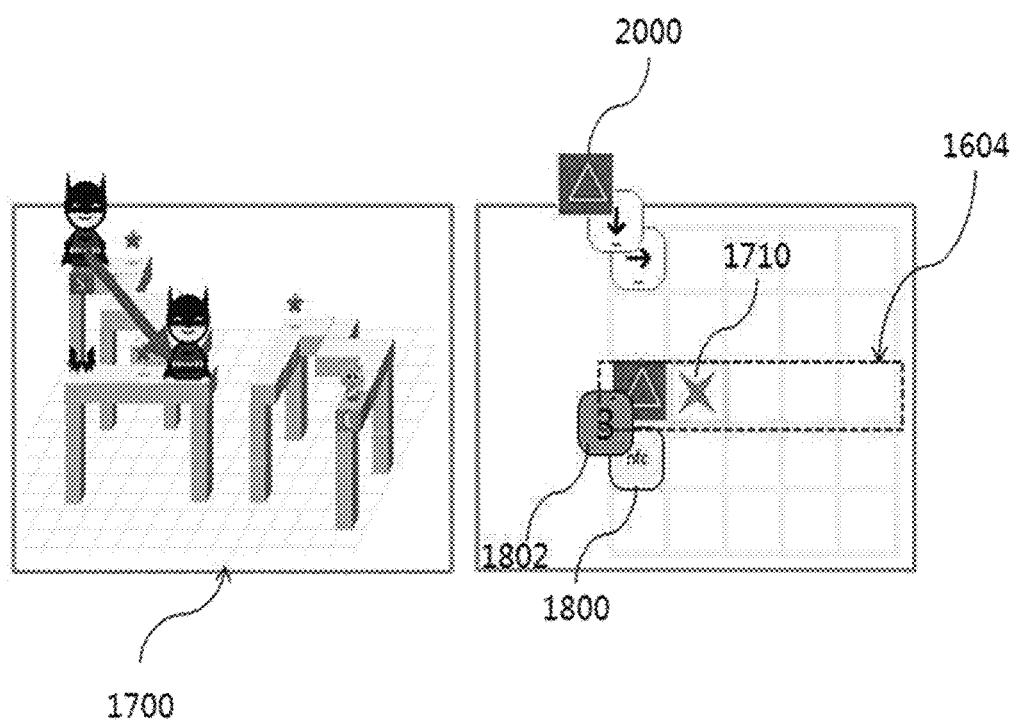
Figure 21:
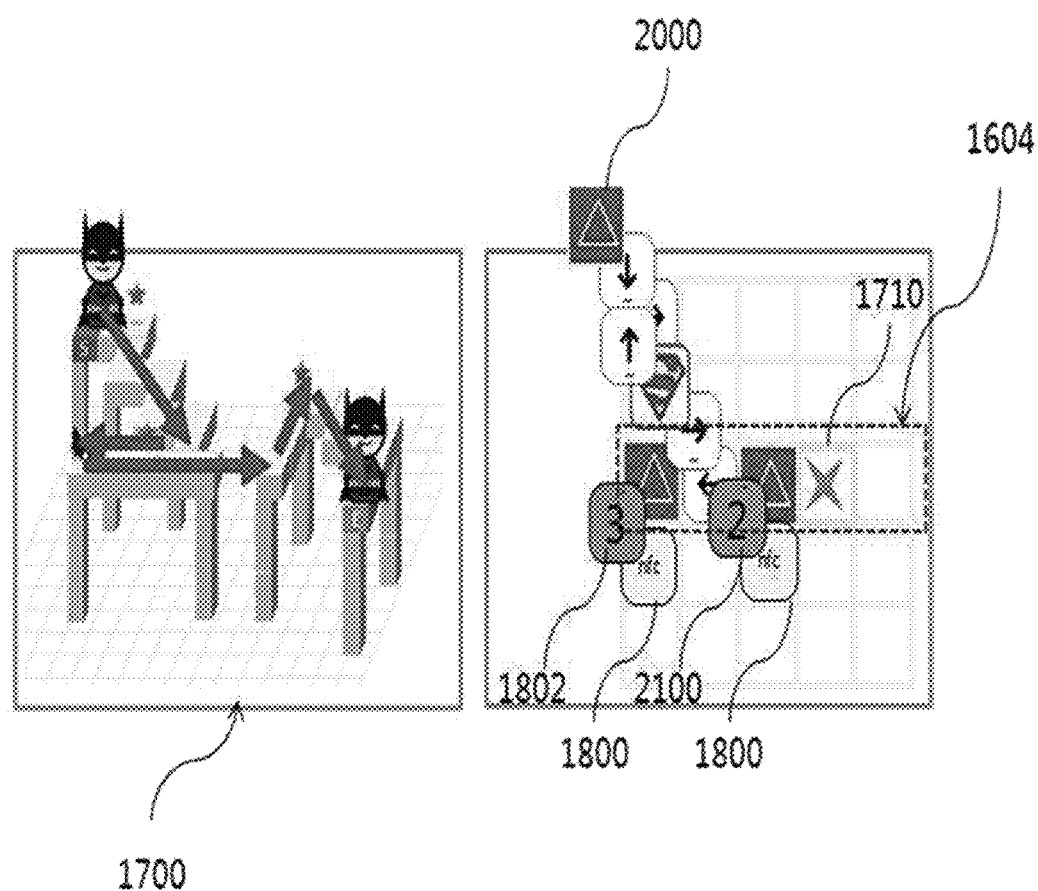

FIG. 20 to FIG. 21 are views a coding process using a function block according to another embodiment of the invention.

In FIG. 20, one function (a first function) may be defined by laminating sequentially a right moving coding block and a downward moving coding block in the function definition area 1800 and laminating a function block 2000 having a certain shape on the downward moving coding block.

As shown in FIG. 20, an instruction corresponding to the function is repeatedly performed by three times if the function block 2000 corresponding to the first function is laid in the instruction definition area 1604 and the NFC block 1800 and the number tag 1802 are disposed adjacent to the function block 2000.

The completion block 1710 is preferably disposed adjacent to the function block 2000 in the instruction definition area 1604 because the function block of the present embodiment is a formative block on which none block can be laid.

In the event that the coding blocks are disposed as shown in FIG. 20, the character moves until a position just before a position corresponding to jump and moves again the first position.

Referring to FIG. 21, one function is defined through the coding blocks related to the moving and the function block 2000 having the certain shape, like in FIG. 20.

In FIG. 21, an action corresponding to the first function is repeatedly performed by three times at a starting point, to complete a routine according to the coding mission information.

Subsequently, a wing item is obtained and then a jump corresponding to a special action is performed, and coding blocks for upward straight line moving is disposed adjacent to a first function block.

Next, the first function corresponding to the right moving the upward moving are repeatedly performed by two times so as to move the end point.

The first function block is disposed adjacent to a position at which the special action coding block locates, and an NFC block and a number tag 2100 corresponding to number 2 are disposed in the repetition number definition area 1606.

A coding is completed if a completion block is disposed adjacent to the first function block.

In one embodiment, the coding may be completed by laminating vertically the coding blocks related to the moving. However, the coding may be completed through small number of coding blocks by defining the function and the repetition number as shown in FIG. 21.

Figure 22:
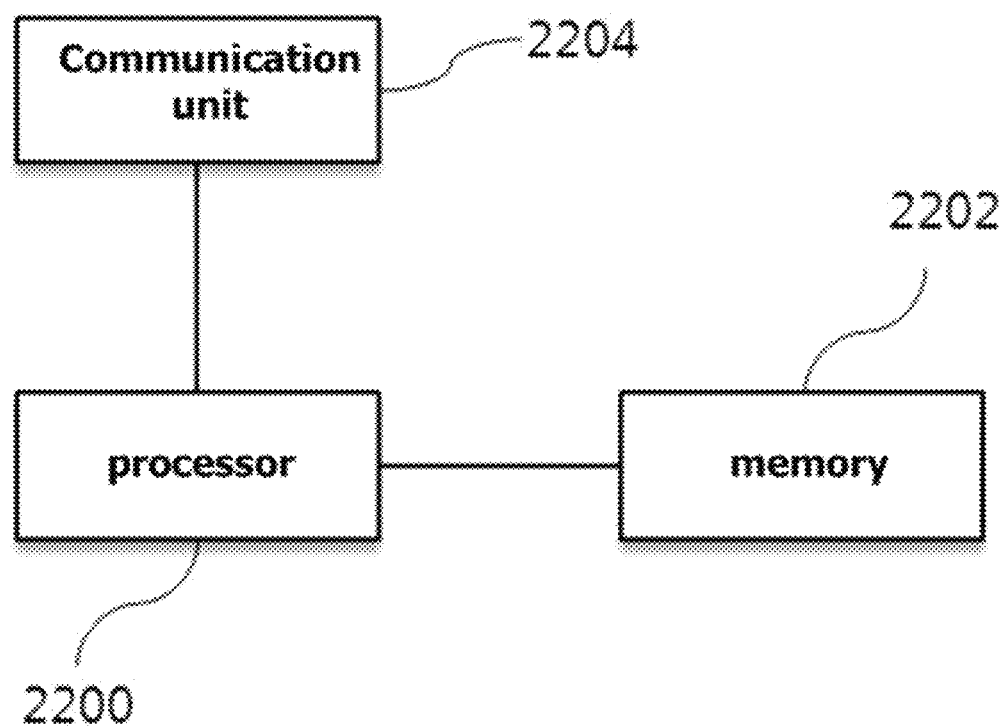

FIG. 22 is a view illustrating a user terminal according to one embodiment of the invention.

As shown in FIG. 22, the user terminal 100 of the present embodiment may include a processor 2200, a memory 2202 and a communication unit 2204.

The processor 2200 may include a central processing unit CPU executable a computer program, an imaginary machine, etc.

The memory 2202 may include a non-volatile storage device such as a fixed hard drive or a removable storage device. The removable storage device may include a compact flash unit, a USB memory stick, etc. The memory 2202 may also include a volatile memory such as a variety of random access memories.

The memory 2202 stores program instructions executable by the processor 2200.

The program instructions recorded on the memory 2202 can be designed and configured specifically for the present invention or can be a type of medium known to and used by the skilled person in the field of computer software. Examples of the program instructions may include not only machine language codes produced by a compiler but also high-level language codes that can be executed by a computer through the use of an interpreter, etc.

The communication unit 2204 communicates with the block plate 110, and receives identification information and location information of the block laid on the block disposition member 200 from the block plate 110.

In one embodiment, the function definition area, the repetition number definition area, the instruction definition area, etc. are preset in the block plate 110. This means that a coordinate of the block disposition member in respective areas is preset.

The user terminal 100 receives identification information and coordinate information of each of the coding blocks disposed on the block plate 110, and may identify an area in which the coding block is disposed of the areas.

Figure 23:
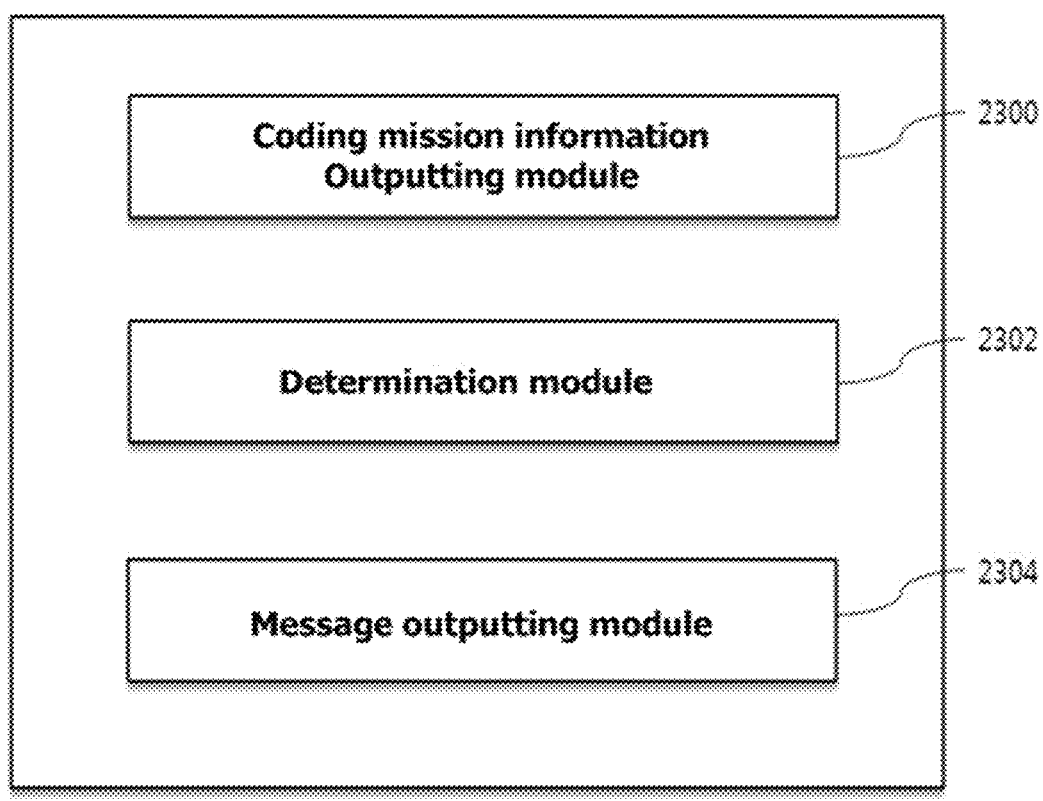
FIG. 23 is a view illustrating a program module stored in a memory according to one embodiment of the invention.

FIG. 23 is a view illustrating a program module stored in a memory according to one embodiment of the invention.

In FIG. 23, the memory 2202 of the present embodiment may include a coding mission information outputting module 2300, a determination module 2302 and a message outputting module 2304.

The coding mission information outputting module 2300 outputs the coding mission information on a screen.

The determination module 2302 determines whether or not the coding blocks are correctly disposed on the block plate 110 according to the coding mission information outputted on the screen.

The determination module 2302 performs the determination when disposition information of the completion block is received through the communication unit 2204.

The message outputting module 2304 outputs a message depending on the determination.

A person having ordinary skill in the art would be able to make various modifications, alterations, and additions without departing from the spirit and scope of the invention, but it is to be appreciated that such modifications, alterations, and additions are encompassed by the scope of claims set forth below.

The invention claimed is:

1. An apparatus for providing a coding education service to a user terminal through a network, the apparatus comprising:
   a block plate comprising a plurality of block disposition members arranged in matrix form to have unique coordinates;
   a plurality of coding blocks configured to be disposed on the plurality of block disposition members;
   a controller configured to identify the plurality of coding blocks disposed on the block disposition members, and generate identification information and location information of the plurality of coding blocks; and
   a communication module configured to transmit the identification information and location information of the plurality of coding blocks to the user terminal so that the user terminal determines whether the coding blocks are disposed in accordance with coding mission information displayed on a screen of the user terminal,
   wherein a first function is defined by
   laminating sequentially a first plurality of coding blocks among the plurality of coding block on a first block disposition member of the plurality of block disposition members and
   disposing a first function block having a first shape on an uppermost part of the laminated first plurality of coding blocks, and
   wherein, when a second function block having the same shape as the first shape is disposed in a second block disposition member of the plurality of block disposition members, the first function is called in corresponding execution order.

2. The apparatus of claim 1, wherein each of the block disposition members belongs to at least one of a function definition area, a repetition number definition area, an instruction definition area, and an input area, respectively.

3. The apparatus of claim 2, wherein
   the plurality of block disposition members are formed in (n×n) structure, and
   one of the function definition area, the repetition number definition area, the instruction definition area and the input area are set as an area corresponding to at least one axis in a vertical direction or a horizontal direction.

4. The apparatus of claim 3, wherein an execution order of each of the plurality of coding blocks is defined in a predetermined direction, in the instruction definition area.

5. The apparatus of claim 3, wherein
   the first function is defined by laminating sequentially the first plurality of coding blocks in the function definition area, and
   the first function is called in corresponding execution order when the second function block is disposed on a certain position of the instruction definition area.

6. The apparatus of claim 3, wherein a repetition number of a first coding block disposed in the instruction definition area or a function is determined by a number block or a number tag disposed in the repetition number definition area adjacent to the first coding block or a function block, having a certain shape, for defining the function.

7. The apparatus of claim 3, wherein when a completion block is disposed in the instruction definition area, the communication module transmits identification information and location information of the coding blocks to the user terminal.

8. The apparatus of claim 2, wherein the input area is an area where at least one of an Near Field Communication (NFC) block on which an NFC tag is laid or a touch block for determining one of conditions locates.

9. The apparatus of claim 3,
   wherein the function definition area is set as an area formed by a $K_{th}$ column and n rows, the repetition number definition area is set as an area formed by a $(K+L)_{th}$ column and the n rows, and the instruction definition area is set as an area formed by a $(K+L+M)_{th}$ column and the n rows, and
   wherein K, L and M are natural numbers more than 1.

10. The apparatus of claim 9, wherein in the instruction definition area, a block disposition member disposed on an uppermost part of the area formed by the $(K+L+1)_{th}$ column and the n rows is defined in a first execution order, and an execution order is defined in an order of a second plurality of coding blocks disposed adjacent to the block disposition member disposed on the uppermost part of the area formed by the $(K+L+1)_{th}$ column.

11. The apparatus of claim 3, wherein one of the function definition area, the instruction definition area, the repetition number definition area and the input area is set in an order of a $K_{th}$ row from a left upper part of a block plate, and the instruction definition area and the repetition number definition area are adjacent each other.

12. The apparatus of claim 11, wherein a second plurality of coding blocks are vertically laminated on one block disposition member in the instruction definition area, and an execution order of the second plurality of coding blocks laminated vertically is determined according to an order laminated from the one block disposition member.

13. The apparatus of claim 11,
wherein the function definition area is set as an area formed by a $K_{th}$ row and n columns, the instruction definition area is set as an area formed by a $(K+L)_{th}$ row and the n columns, and the repetition number definition area is set as an area formed by a $(K+L+M)_{th}$ row and the n columns, and
wherein K, L and M are natural numbers more than 1.

14. The apparatus of claim 13, wherein the input area is set as an area formed by a $(K+L+M+1)_{th}$ row and the n columns.

15. An apparatus for providing a coding education service to a block plate comprising a plurality of block disposition members arranged in matrix form to have unique coordinates and a plurality of coding blocks configured to be disposed on the plurality of block disposition members, through a network, the apparatus comprising:
a communication unit configured to receive identification information and location information of the plurality of coding blocks on the block plate from the block plate;
a processor; and
a memory connected to the processor,
wherein
the memory stores coding mission information and program instructions executable by the processor,
the processor is configured to display, from the memory, the coding mission information on a screen, and to determine whether the plurality of coding blocks are correctly disposed according to the coding mission information by using the received identification information and the received location information,
wherein the processor is configured to define a first function by
laminating sequentially a first plurality of coding blocks among the plurality of coding block on a first block disposition member of the plurality of block disposition members and
disposing a first function block having a first shape on an uppermost part of the laminated first plurality of coding blocks, and wherein, when a second function block having the same shape as the first shape is disposed in a second block disposition member of the plurality of block disposition members, the first function is called in corresponding execution order.

16. The apparatus of claim 15, wherein one of a function definition area, a repetition number definition area, an instruction definition area and an input area are preset on the block plate.

17. A method of providing a coding education service, the method performed by a server and a user terminal connected with a block plate comprising a plurality of block disposition members arranged in matrix form to have unique coordinates and a plurality of coding blocks configured to be disposed on the plurality of block disposition members, through a network, the method comprising:
receiving, by the server, a coding mission information providing request from the user terminal;
transmitting, by the server, a plurality of coding mission information and a plurality of instructions corresponding to each of the plurality of coding mission information, function information, and individual instruction or repetition number information of a function to the user terminal;
outputting, by the user terminal, one of the plurality of coding mission information on a screen of the user terminal;
receiving, by the user terminal and from the block plate, identification information and location information of the plurality of coding blocks disposed on the block plate
determining, by the user terminal, whether the plurality of coding blocks are correctly disposed according to the coding mission information outputted on the screen,
wherein a first function is defined by
laminating sequentially a first plurality of coding blocks among the plurality of coding block on a first block disposition member of the plurality of block disposition members and
disposing a first function block having a first shape on an uppermost part of the laminated first plurality of coding blocks, and
wherein, when a second function block having the same shape as the first shape is disposed in a second block disposition member of the plurality of block disposition members, the first function is called in corresponding execution order.

\* \* \* \* \*